(12) United States Patent
Huber et al.

(10) Patent No.: US 7,808,676 B2
(45) Date of Patent: Oct. 5, 2010

(54) METHOD FOR CONVERTING COLOR MEASURED VALUES IN POLARIZED OR UNPOLARIZED FORM

(75) Inventors: Werner Huber, Wiesloch (DE); Frank Muth, Karlsruhe (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 204 days.

(21) Appl. No.: 12/130,304

(22) Filed: May 30, 2008

(65) Prior Publication Data

US 2008/0298825 A1 Dec. 4, 2008

(30) Foreign Application Priority Data

May 30, 2007 (DE) .................. 10 2007 025 005

(51) Int. Cl.
*H04N 1/60* (2006.01)
*H04N 1/46* (2006.01)
*G06K 9/00* (2006.01)

(52) U.S. Cl. .................. 358/1.9; 358/515; 358/512; 358/518; 382/162; 382/167; 382/112

(58) Field of Classification Search .............. 358/1.9, 358/515, 512, 518; 382/162, 167, 112; 702/104; 101/484, 483, 211, 171; 347/262
See application file for complete search history.

(56) References Cited

U.S. PATENT DOCUMENTS

| 6,564,714 B2* | 5/2003 | Brydges et al. ............. 101/484 |
| 6,597,454 B1 | 7/2003 | Berg et al. |
| 2003/0169440 A1 | 9/2003 | Engler et al. |
| 2007/0260413 A1* | 11/2007 | Ehbets et al. ............... 702/104 |

FOREIGN PATENT DOCUMENTS

| DE | 10257981 A1 | 7/2003 |
| DE | 102004040621 A1 | 3/2006 |

OTHER PUBLICATIONS

Loos, Hansl: "Farbmessung", Verlag Beruf + Schule, Itzehoe, Germany, 1989, p. 67.
German Search Report date Jun. 10, 2008.

* cited by examiner

*Primary Examiner*—Charlotte M Baker
(74) *Attorney, Agent, or Firm*—Laurence A. Greenberg; Werner H Stemer; Ralph E Locher

(57) ABSTRACT

A method for converting polarized color measured values to unpolarized color measured values or vice versa uses a computer. The conversion is carried out by the computer by using a pair of reference measured values determined in polarized and unpolarized form.

6 Claims, 2 Drawing Sheets

METHOD FOR CONVERTING COLOR MEASURED VALUES IN POLARIZED OR UNPOLARIZED FORM

CROSS-REFERENCE TO RELATED APPLICATION

This application claims the priority, under 35 U.S.C. §119, of German patent application DE 10 2007 025 005.5, filed May 30, 2007; the prior application is herewith incorporated by reference in its entirety.

BACKGROUND OF THE INVENTION

Field of the Invention

The present invention relates to a method for converting polarized color measured values to unpolarized color measured values or vice versa with a computer.

Color measurement and control devices, which are able to register color measured values in polarized or unpolarized form, are used to control print quality, in particular coloration. In the case of polarized measurement, use is made of a color filter which filters out specific constituents, such as UV light, from the measured spectrum. The color measured values in polarized and unpolarized measurement differ, so that only measured values registered by the same method can be compared with one another and used for color control. In that case, a printing material is registered in polarized form with a color measuring device while the comparative color measured values are present only in unpolarized form, with the converse also being entirely true. The color measured values are normally not present in both measured forms. If, then, an original print is measured in polarized form while the printing materials of a printing press are measured in unpolarized form, the measured values are not comparable and cannot be used directly for color control. In that case, it is necessary to change the unpolarized color measured values to polarized ones and vice versa.

BRIEF SUMMARY OF THE INVENTION

It is accordingly an object of the invention to provide a method for converting polarized color measured values to unpolarized color measured values or vice versa with a computer, which overcomes the hereinafore-mentioned disadvantages of the heretofore-known methods of this general type.

With the foregoing and other objects in view there is provided, in accordance with the invention, a method for converting polarized color measured values to unpolarized color measured values or vice versa. The method comprises carrying out the conversion of the polarized color measured values to unpolarized color measured values or vice versa with a computer by using a pair of reference measured values determined in polarized and unpolarized form.

In this case, the registered color measured values can be registered by colorimetry or densitometry. The pair of reference measured values stored in the computer is formed of a color measured value measured in unpolarized and polarized form with the same ink layer thickness. The color measured values registered during the measuring method are converted into the respective other type with recourse to this pair of reference measured values.

In accordance with another mode of the invention, at least one pair of reference measured values including polarized and unpolarized measured values and belonging to a color measurement at a first layer thickness is stored in a computer connected to a color measuring device; by using the color measuring device, an unpolarized or polarized color measurement is carried out on a printing material at a second ink layer thickness; in relation to the color measured value determined in the process, through the use of a color model, the color measured value of the same type which lies on a common coloring line and belongs to the first layer thickness is calculated; the color error of the calculated measured value in relation to the stored measured value of the same type of the stored pair of measured values is calculated; in relation to the color measured value of the other type of the stored pair of measured values, through the use of the color model, the associated color measured value which lies on the same coloring line and belongs to the second layer thickness is calculated; and this calculated color measured value is corrected by the previously calculated color error.

Unpolarized and polarized color measured values at a second ink layer thickness, which differs from the ink layer thickness of the pair of reference measured values, can be converted into one another by using this correction method even when the registered polarized or unpolarized color measured values at the second layer thickness do not lie on the coloring lines on which the color measured values of the pair of reference measured values lie. The different coloring lines can be corrected appropriately by the calculated color error and the correction vector produced therefrom. In order to be able to take the different thicknesses of the first and second ink layer into account, the layer thickness change between the first and second ink layer thickness must be calculated through a color model which converts the color measured value in the same measuring method of the first layer thickness to the color measured value of the second layer thickness or vice versa. In this way, a method is devised which takes into account both different ink layer thicknesses and the position with respect to different coloring lines.

In accordance with a further mode of the invention, provision is made for color measured values to be registered in polarized or unpolarized form on an original print through the use of a color measuring device and for the printing materials produced by a printing press to be measured in unpolarized or polarized form in the respective other way through the use of a color measuring device. In the case of the colorimetric measurement of printing materials, inline color measuring devices or separate color measuring devices can be used. Inline color measuring devices are normally found in the printing press following the last printing unit, where they register the printing material calorimetrically while the machine is running. Separate color measuring devices have a support table, on which a produced sheet printing material is laid and then scanned by the color measuring device. The produced printing materials have to be compared with the original print for the purpose of quality control. If the color measured values deviate from one another and those deviations lie outside the tolerances, the printing quality is not adequate and the ink metering in the printing press must be changed. The color measured values from the original print are normally present only either in polarized or unpolarized form. The color measuring device for printing quality control is in turn fixed to one type of measurement in most cases and can measure either only in polarized or unpolarized form. On the basis of the conversion according to the invention, it is now possible for original prints to be measured in one way and for the printing materials of the printing press to be measured in the other way. The way in which the original print is measured accordingly does not play any part. The operator of the printing press merely has to have one form of color measuring device in order to be able to carry out his or her printing quality control.

In accordance with an added mode of the invention, provision is advantageously made for the color measured values registered on the printing materials produced by using the printing press to be converted to that type in which they correspond to the type of color measured values from the original print and are compared with the latter by computation, and deviations therefrom are registered. As already explained, only the same type of color measured values can be compared with one another. Therefore, the color measured values registered from the printing materials are converted to the color measured values from the original print or vice versa and then the same type of color measured values are compared with one another, with inadmissible deviations being registered. The deviations registered through the use of the computer can then be converted into actuating values for driving an ink metering device in the inking unit of a printing press. For instance, by using the actuating values, the inking zone slides in the ink fountain of an inking unit of the printing press can have their opening changed, so that a change in the coloration is possible.

In accordance with a concomitant mode of the invention, provision is advantageously made for the differences between the converted color measured values and the color measured values from the original print to be minimized by driving the ink metering device. In this way, a color control is implemented in which the printing materials produced lie as close as possible to the original print.

Other features which are considered as characteristic for the invention are set forth in the appended claims.

Although the invention is illustrated and described herein as embodied in a method for converting color measured values in polarized or unpolarized form, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
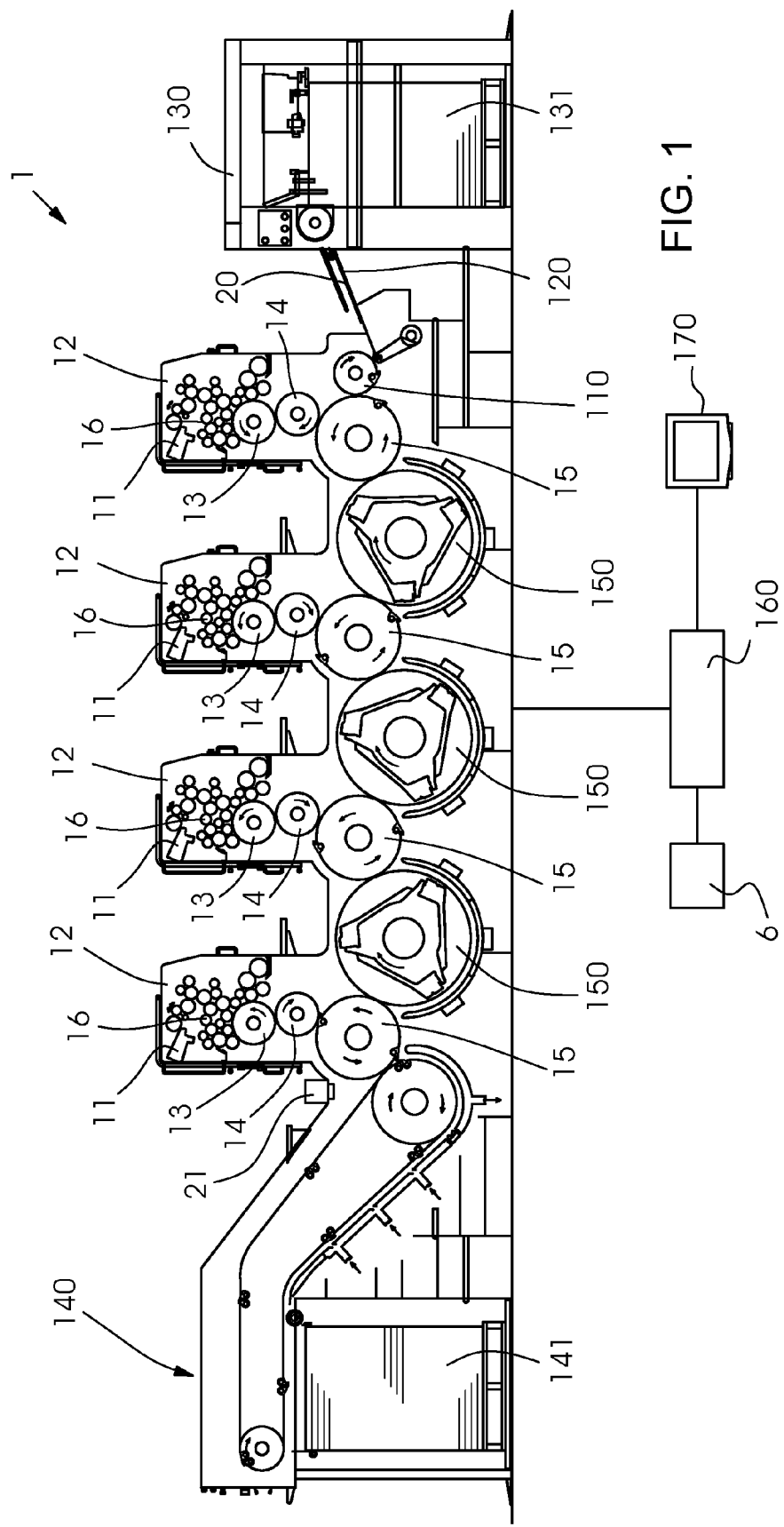
FIG. 1 is a diagrammatic, longitudinal-sectional view of a sheetfed printing press having two color measuring devices.

Referring now to the figures of the drawings in detail and first, particularly, to FIG. 1 thereof, there is seen a printing press 1 having four printing units 12, which are constructed largely identically. Thus, each printing unit 12 includes an inking unit 16 which has an ink metering device 11. The ink metering device 11 is preferably provided with inking zones, so that a plurality of inking zones can be controlled separately from one another over the entire width of a printing material 20. Printing ink passes from the inking unit 16 over numerous rolls to a plate cylinder 13 with a printing plate clamped thereon. From there, the ink is transferred further to a blanket cylinder 14 which, together with an impression cylinder 15, forms a press nip in each printing unit 12. The sheet printing materials 20 are printed with the respective color separation in this press nip. The printing press 1 is supplied with the sheets 20 by a sheet feeder 130, which removes sheets 20 from a feed pile 131 through the use of a suction head and feeds them separately over a suction belt table 120 to a feed drum 110 in the first printing unit 12 of the printing press 1. From there, the sheets 20 are transported through all four printing units 12, with the sheets 20 being led between the printing units 12 in each case over transport cylinders 150. Following the last printing unit 12, the finished printing materials are deposited on a delivery pile 141 in a delivery 140.

The printing press 1 is controlled through the use of a control computer 160, which monitors and controls all of the actuating operations in the printing press 1. Actuating operations can be performed by operating personnel of the printing press 1 through a monitor 170 connected to the control computer 160 and having input elements such as a keyboard, mouse or touch screen. A separate color measuring device 6, with which sheets 20 can be registered calorimetrically, is additionally connected to the control computer 160. The sheets 20 are removed from the delivery pile 141 and placed under the color measuring device 6 for this purpose. The measured data registered in this way can then be compared with measuring data from the original print in the control computer 160, which is then able to send appropriate actuating commands to the ink metering device 11 in the individual printing units 12 to minimize color deviations. Furthermore, the printing press 1 has an inline color measuring device 21, which is located at the exit from the last printing unit 12. The sheets 20 can be measured while still in the printing press 1 by using this inline color measuring device 21. The measured data from the inline color measuring device 21 are likewise transmitted to the control computer 160 and are compared there with the data from the original print. In the present case, the inline color measuring device 21 is provided with a polarizing filter, while the separate color measuring device 6 measures without a polarizing filter. The polarized color measured values have to be converted to unpolarized ones and vice versa in order to be able to compare the color measured values with one another.

Figure 2:
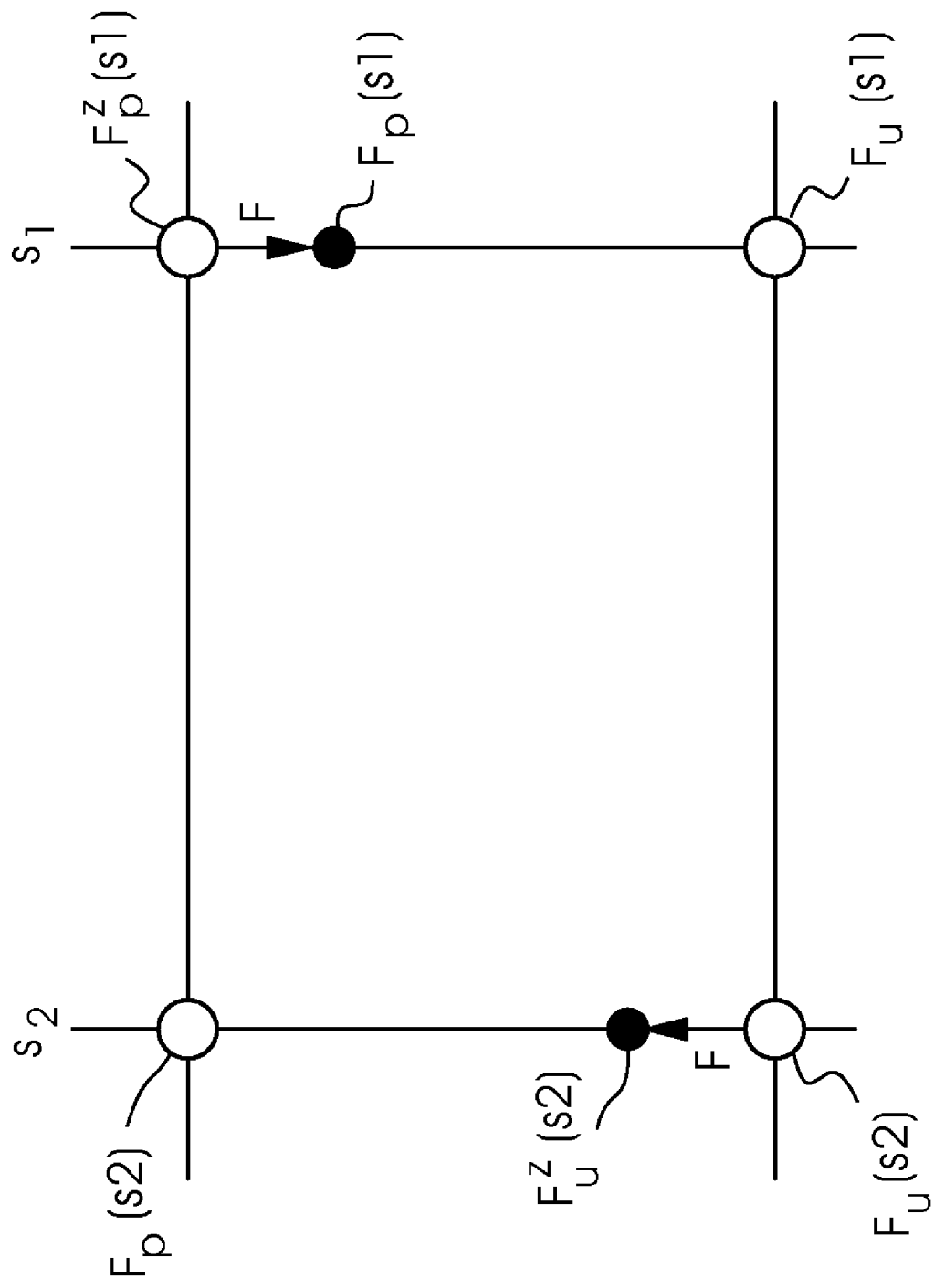
FIG. 2 is a conversion diagram for polarized and unpolarized color measured values.

FIG. 2 shows a method for converting polarized color measured values to unpolarized color measured values and vice versa in a diagram. As an example, the conversion of color measured values measured in polarized form into unpolarized color measured values will be indicated below. However, the method can also be used equally well in the opposite direction. The core of the conversion method is a pair of reference measured values including a color measured value $F_P(s_1)$ recorded through the use of a polarized measurement, and a color measured value $F_u(s_1)$ recorded through the use of an unpolarized measurement. The two color measured values $F_P(s_1)$ and $F_u(s_1)$ are two colorimetric color measured values corresponding to each other. This means that the two color measured values $F_P(s_1)$ and $F_u(s_1)$ correspond in the other respective color measuring system. The two color measured values $F_P(s_1)$ and $F_u(s_1)$ have therefore also been recorded at the same ink layer thickness $s_1$. Any other desired color measured values can subsequently be converted to one another through the use of these two color measured values $F_P(s_1)$ and $F_u(s_1)$ corresponding to each other.

In FIG. 2, the color measured value $F_P(s_2)$ is measured at any desired second ink layer thickness $s_2$ by using a color measuring device measuring in polarized form, like the inline color measuring device 21. In all probability, this color measured value $F_P(s_2)$ measured in polarized form will not lie on a common coloring line like the color measured value $F_P(s_1)$ stored in the control computer 160. A corrected polarized color measured value at the first layer thickness $F^Z_P(s_1)$ belonging to the ink layer thickness $s_1$ and on the same coloring line as the registered polarized color measured value $F_P(s_2)$ is determined by computation through the use of a color model which takes into account the ink layer thickness change between the two ink layer thicknesses $s_1$ and $s_2$. After that, the computer 160 determines the color difference between the values $F^Z_P(s_1)$ and $F_P(s_1)$ and stores this difference as a correction vector F. In a manner analogous to that in the polarized case, in addition to the unpolarized color measured value $F_u(s_1)$ stored in the computer 160, through the same ink layer thickness model, the unpolarized color measured value at the second layer thickness $F_u(s_2)$ belonging to the ink layer thickness $s_2$ and lying on the same coloring line as $F_u(s_1)$ is calculated.

In order to reach a color target value $F^Z_u(s_2)$, namely the corrected unpolarized color measured value at the second layer thickness $s_2$, the correction vector F is added to the calculated unpolarized color measured value $F_u(s_2)$ at the second layer thickness $s_2$. The corrected unpolarized color measured value at the second layer thickness $F^Z_u(s_2)$ calculated in this manner is then the unpolarized counterpart of the color measured value $F_P(s_2)$ measured in polarized form. In this way, by using a pair of reference measured values, it is possible to convert any desired polarized color measured values to unpolarized ones and vice versa. The color model used in the process is not necessarily limited to a layer thickness model. It is also possible for other color models to be used. However, it is important in this case that the color model be able to describe in relative terms the reflectance changes in the event of a layer thickness change. The method can be used in calorimetric and densitometric color measurements.

The invention claimed is:

1. A method for converting polarized color measured values to unpolarized color measured values or vice versa, the method comprising the following steps:
   carrying out the conversion of the polarized color measured values to unpolarized color measured values or vice versa with a computer by using a pair of reference measured values determined in polarized and unpolarized form;
   storing at least one pair of reference measured values including polarized and unpolarized measured values and belonging to a color measurement at a first layer thickness, in a computer connected to a color measuring device;
   carrying out an unpolarized or polarized color measurement on a printing material at a second ink layer thickness, by using the color measuring device;
   calculating, in relation to a thus registered color measured value, a color measured value of the same type lying on a common coloring line and belonging to the first layer thickness, by using a color model;
   calculating a color error of the calculated measured value in relation to the stored measured value of the same type of the stored pair of measured values;
   calculating, in relation to the color measured value of the other type of the stored pair of measured values, the associated color measured value lying on the same coloring line and belonging to the second layer thickness, by using the color model; and
   correcting the associated color measured value lying on the same coloring line and belonging to the second layer thickness by the previously calculated color error.

2. The method according to claim 1, which further comprises calculating an ink layer thickness change converting a color measured value of the first layer thickness into a color measured value of the same type of the second layer thickness, with the computer by using the color model.

3. The method according to claim 1, which further comprises:
   registering color measured values in polarized or unpolarized form on an original print with a color measuring device; and
   measuring the printing materials produced by a printing press in unpolarized or polarized form in the other respective type by a color measuring device.

4. The method according to claim 3, which further comprises:
   converting the color measured values registered on the printing materials produced by using the printing press to a type in which they correspond to the type of color measured values from the original print;
   comparing the color measured values registered on the printing materials produced by using the printing press with the color measured values from the original print by computation; and
   registering deviations of the color measured values registered on the printing materials produced by using the printing press from the color measured values from the original print.

5. The method according to claim 4, which further comprises converting deviations registered by the computer into actuating values for driving an ink metering device in an inking unit of a printing press.

6. The method according to claim 5 which further comprises minimizing differences between the converted color measured values and the color measured values from the original print by driving the ink metering device.

* * * * *